(12) United States Patent
Godard et al.

(10) Patent No.: US 10,552,833 B2
(45) Date of Patent: *Feb. 4, 2020

(54) SYSTEMS AND METHODS FOR FACILITATING ACCOUNT VERIFICATION OVER A NETWORK

(71) Applicant: PAYPAL, INC., San Jose, CA (US)

(72) Inventors: Nolwenn Godard, San Francisco, CA (US); Ji Zhang, Mountain View, CA (US); Mehul Asher, Mountain View, CA (US); Maulshree Goyal, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 15/859,146

(22) Filed: Dec. 29, 2017

(65) Prior Publication Data

US 2018/0260810 A1 Sep. 13, 2018

Related U.S. Application Data

(63) Continuation of application No. 14/709,321, filed on May 11, 2015, now Pat. No. 9,858,570, which is a
(Continued)

(51) Int. Cl.
*G06Q 20/38* (2012.01)
*G06Q 20/40* (2012.01)
(Continued)

(52) U.S. Cl.
CPC ........... *G06Q 20/385* (2013.01); *G06Q 20/10* (2013.01); *G06Q 20/40* (2013.01); *G06Q 30/06* (2013.01); *G06Q 40/12* (2013.12)

(58) Field of Classification Search
CPC ...... G06Q 20/385; G06Q 20/10; G06Q 40/12; G06Q 20/40; G06Q 30/06
See application file for complete search history.

(56) References Cited

U.S. PATENT DOCUMENTS 6,882,986 B1 * 4/2005 Heinemann ............ G06Q 20/10
705/24
7,120,608 B1 * 10/2006 Gallagher .......... G06Q 20/0855
705/68
(Continued)

*Primary Examiner* — Ashford S Hayles
(74) *Attorney, Agent, or Firm* — Haynes and Boone LLP

(57) ABSTRACT

In accordance with embodiments of the present disclosure, systems and methods for facilitating electronic commerce over a network include generating a transfer code for a client, associating the transfer code to a client account related to the client, providing the transfer code to the client over the network, receiving a fund transfer request from a trusted entity on behalf of the client over the network, the fund transfer request including the transfer code, extracting information from the fund transfer request including the transfer code associated with the fund transfer request, accessing the client account related to the client, extracting information from the client account including the transfer code associated with the client account, and verifying the transfer code of the fund transfer request by determining whether the transfer code associated with the client account matches the transfer code extracted from the fund transfer request.

20 Claims, 5 Drawing Sheets

Related U.S. Application Data continuation of application No. 12/694,945, filed on Jan. 27, 2010, now abandoned.

(51) Int. Cl.
  *G06Q 30/06* (2012.01)
  *G06Q 40/00* (2012.01)
  *G06Q 20/10* (2012.01)

(56) References Cited

U.S. PATENT DOCUMENTS

| | | | | |
|---|---|---|---|---|
| 7,529,706 B2* | 5/2009 | Kulasooriya | G06Q 20/10 | 705/37 |
| 7,536,325 B2* | 5/2009 | Randell | G06Q 30/04 | 705/30 |
| 7,742,994 B1* | 6/2010 | Gupta | G06Q 20/367 | 705/64 |
| 7,844,546 B2* | 11/2010 | Fleishman | G06Q 20/40 | 705/39 |
| 7,991,658 B2* | 8/2011 | Bond | G06Q 30/0601 | 705/26.1 |
| 8,055,557 B2* | 11/2011 | Sorbe | G06Q 20/10 | 705/30 |
| 2002/0059146 A1* | 5/2002 | Keech | G06Q 20/02 | 705/64 |
| 2002/0087344 A1* | 7/2002 | Billings | G06Q 20/10 | 705/39 |
| 2003/0070080 A1* | 4/2003 | Rosen | G06Q 20/02 | 713/187 |
| 2003/0105710 A1* | 6/2003 | Barbara | G06Q 20/04 | 705/39 |
| 2004/0068448 A1* | 4/2004 | Kim | G06Q 20/04 | 705/40 |
| 2004/0088258 A1* | 5/2004 | McCoy | G06Q 20/04 | 705/43 |
| 2004/0139008 A1* | 7/2004 | Mascavage, III | G06Q 20/04 | 705/40 |
| 2005/0055296 A1* | 3/2005 | Hattersley | G06Q 40/00 | 705/35 |
| 2005/0149439 A1* | 7/2005 | Suisa | G06Q 20/04 | 705/44 |
| 2005/0182720 A1* | 8/2005 | Willard | G06Q 20/102 | 705/40 |
| 2005/0222963 A1* | 10/2005 | Johnson | G06Q 20/3674 | 705/67 |
| 2005/0246293 A1* | 11/2005 | Ong | G06Q 20/02 | 705/70 |
| 2006/0178943 A1* | 8/2006 | Rollinson | G06Q 30/0601 | 705/26.1 |
| 2006/0184428 A1* | 8/2006 | Sines | G06Q 20/382 | 705/26.35 |
| 2006/0190346 A1 | 8/2006 | Sines et al. | | |
| 2006/0206425 A1* | 9/2006 | Sharma | G06Q 20/02 | 705/40 |
| 2006/0235795 A1* | 10/2006 | Johnson | G06Q 20/02 | 705/44 |
| 2007/0245022 A1* | 10/2007 | Olliphant | G06Q 30/02 | 709/225 |
| 2007/0250440 A1* | 10/2007 | Paulsen | G06Q 20/02 | 705/39 |
| 2007/0255662 A1* | 11/2007 | Tumminaro | G06Q 20/027 | 705/79 |
| 2007/0260536 A1* | 11/2007 | Stone | G06Q 20/042 | 705/39 |
| 2007/0272736 A1* | 11/2007 | Brooks | G06Q 20/10 | 235/379 |
| 2007/0282739 A1* | 12/2007 | Thomsen | G06Q 20/10 | 705/39 |
| 2008/0040261 A1* | 2/2008 | Nix | G06O 20/04 | 705/39 |
| 2008/0091600 A1* | 4/2008 | Egnatios | G06Q 20/10 | 705/42 |
| 2008/0134295 A1* | 6/2008 | Bailey | G06F 21/41 | 726/4 |
| 2008/0140548 A1* | 6/2008 | Csoka | G06Q 20/10 | 705/30 |
| 2008/0154773 A1* | 6/2008 | Ranzini | G06Q 20/02 | 705/44 |
| 2008/0210751 A1* | 9/2008 | Kim | G06Q 10/00 | 235/379 |
| 2008/0262972 A1* | 10/2008 | Blake | G06Q 20/401 | 705/75 |
| 2009/0034521 A1* | 2/2009 | Kato | G06F 21/31 | 370/389 |
| 2009/0106134 A1* | 4/2009 | Royyuru | G06Q 20/40 | 705/35 |
| 2009/0132351 A1* | 5/2009 | Gibson | G06Q 20/02 | 705/12 |
| 2009/0150271 A1* | 6/2009 | Bishop | G06Q 20/10 | 705/30 |
| 2009/0171836 A1* | 7/2009 | Olliphant | G06Q 20/10 | 705/39 |
| 2009/0287601 A1* | 11/2009 | Tumminaro | G06Q 20/10 | 705/39 |
| 2009/0307133 A1* | 12/2009 | Holloway | G06Q 20/04 | 705/44 |
| 2009/0313148 A1* | 12/2009 | O'Hara | G06Q 20/02 | 705/30 |
| 2009/0313167 A1* | 12/2009 | Dujari | G06Q 20/042 | 705/43 |
| 2009/0313681 A1* | 12/2009 | Kim | G06Q 20/40 | 726/4 |
| 2010/0057552 A1* | 3/2010 | O'Leary | G06Q 20/04 | 705/14.27 |
| 2010/0131415 A1* | 5/2010 | Sartipi | G06Q 20/02 | 705/75 |
| 2010/0153249 A1* | 6/2010 | Yuan | G06Q 20/02 | 705/34 |
| 2010/0191622 A1* | 7/2010 | Reiss | G06O 20/02 | 705/30 |
| 2010/0217691 A1* | 8/2010 | Gillin | G06Q 20/04 | 705/26.1 |
| 2010/0299256 A1 | 11/2010 | Gallagher et al. | | |
| 2011/0035294 A1* | 2/2011 | Mizrah | G06F 21/33 | 705/26.42 |
| 2011/0055077 A1* | 3/2011 | French | G06Q 20/04 | 705/39 |
| 2011/0145152 A1* | 6/2011 | McCown | G06Q 20/02 | 705/67 |
| 2012/0084201 A1* | 4/2012 | Ostrovsky | G06Q 20/04 | 705/39 |
| 2013/0060698 A1* | 3/2013 | Ramavarjula | G06Q 20/10 | 705/44 |
| 2014/0081868 A1* | 3/2014 | James | G06Q 20/02 | 705/44 |
| 2014/0351146 A1* | 11/2014 | Johnson | G06Q 20/02 | 705/71 |
| 2015/0302404 A1* | 10/2015 | Ruffer | G06Q 20/24 | 705/44 |

\* cited by examiner

SYSTEMS AND METHODS FOR FACILITATING ACCOUNT VERIFICATION OVER A NETWORK

CROSS REFERENCE TO RELATED APPLICATION

This application is a continuation of U.S. patent application Ser. No. 14/709,321, filed May 11, 2015, which is a continuation of U.S. patent application Ser. No. 12/694,945, filed Jan. 27, 2010, which is hereby incorporated by reference in its entirety.

BACKGROUND

Technical Field

The present invention generally relates to network transactions and, more particularly, to facilitating electronic commerce, including account verification, over a network.

Related Art

In electronic commerce, a user typically conducts financial transactions through electronic communication with online service providers over communication networks, such as the Internet. During the course of engaging in electronic commerce, the user provides identification information prior to requesting an online financial transaction. In general, conventional identification options include, for example, some form of payment media, such as a debit card number or a credit card number.

As such, in many instances, conventional identity verification techniques utilized by service providers require a user to provide a debit card number or credit card number to establish an online account and deposit funds to the online account from another account linked to the debit card or credit card. Unfortunately, since some users do not have a debit card or a credit card, these users often have difficulty depositing funds to the online account with the service provider.

Accordingly, these conventional identity verification techniques are insufficient and sometimes inconvenient for the user because the user is required to obtain either a debit card or a credit card, which may not be possible for the user. Hence, there exists a need to provide an improved verification technique to facilitate online financial transactions.

SUMMARY

In accordance with embodiments of the present disclosure, systems and methods for facilitating electronic commerce over a network include generating a transfer code for a client, associating the transfer code to a client account related to the client, providing the transfer code to the client over the network, receiving a fund transfer request from a trusted entity on behalf of the client over the network, the fund transfer request including the transfer code, extracting information from the fund transfer request including the transfer code associated with the fund transfer request, accessing the client account related to the client, extracting information from the client account including the transfer code associated with the client account, verifying the transfer code of the fund transfer request by determining whether the transfer code associated with the client account matches the transfer code extracted from the fund transfer request, approving the fund transfer request if the transfer code associated with the client account matches the transfer code extracted from the fund transfer request, and denying the fund transfer request if the transfer code associated with the client account fails to match the transfer code extracted from the fund transfer request.

In various implementations, the transfer code is a transfer identification (ID) code or a smart identification (ID) code, and providing the transfer code to the client over the network allows the client to include the transfer code in the fund transfer request. The fund transfer request received from the trusted entity over the network includes a client name related to the client along with the transfer code, and wherein the trusted entity comprises a regulated banking institution. In one aspect, the fund transfer request is initiated by the client via accessing the trusted entity over the network, wherein the trusted entity receives a request from the client to transfer funds from the trusted entity to the client account over the network.

In various implementations, the systems and methods may include extracting information from the fund transfer request including a client name associated with the fund transfer request, extracting information from the client account including a client name associated with the client account, verifying an identity of the client by determining whether the client name associated with the client account matches the client name extracted from the fund transfer request, approving the fund transfer request if the client name associated with the client account matches the client name extracted from the fund transfer request, and denying the fund transfer request if the client name associated with the client account fails to match the client name extracted from the fund transfer request. The systems and methods may include establishing the client account with the client over the network, and updating the client account by listing the client as a verified client after approving the fund transfer request. The systems and methods may include receiving monetary funds from the trusted entity on behalf of the client, if the fund transfer request is approved, and rejecting monetary funds from the trusted entity, if the fund transfer request is denied. The systems and methods may include maintaining a plurality of accounts including the client account, and storing information related to the client as part of the client account including the client name of the client and the transfer code. The systems and methods may include notifying the client over the network if the fund transfer request is approved, and notifying the client over the network if the fund transfer request is denied.

In accordance with embodiments of the present disclosure, a system for facilitating electronic commerce over a network includes a network interface component adapted to communicate with a trusted entity and a client over the network and a processing component adapted to generate a transfer code for the client, associate the transfer code to a client account related to the client, and provide the transfer code to the client over the network. The processing component may be adapted to receive a fund transfer request from the trusted entity on behalf of the client over the network, the fund transfer request including the transfer code, extract information from the fund transfer request including the transfer code associated with the fund transfer request, access the client account related to the client, extract information from the client account including the transfer code associated with the client account, and verify the transfer code of the fund transfer request by determining whether the transfer code associated with the client account matches the transfer code extracted from the fund transfer request. The processing component may be adapted to approve the fund transfer request if the transfer code associated with the client account matches the transfer code extracted from the fund transfer request and deny the fund transfer request if the transfer code associated with the client account fails to match the transfer code extracted from the fund transfer request.

These and other features and advantages of the present disclosure will be more readily apparent from the detailed description of the embodiments set forth below taken in conjunction with the accompanying drawings.

Figure 1:
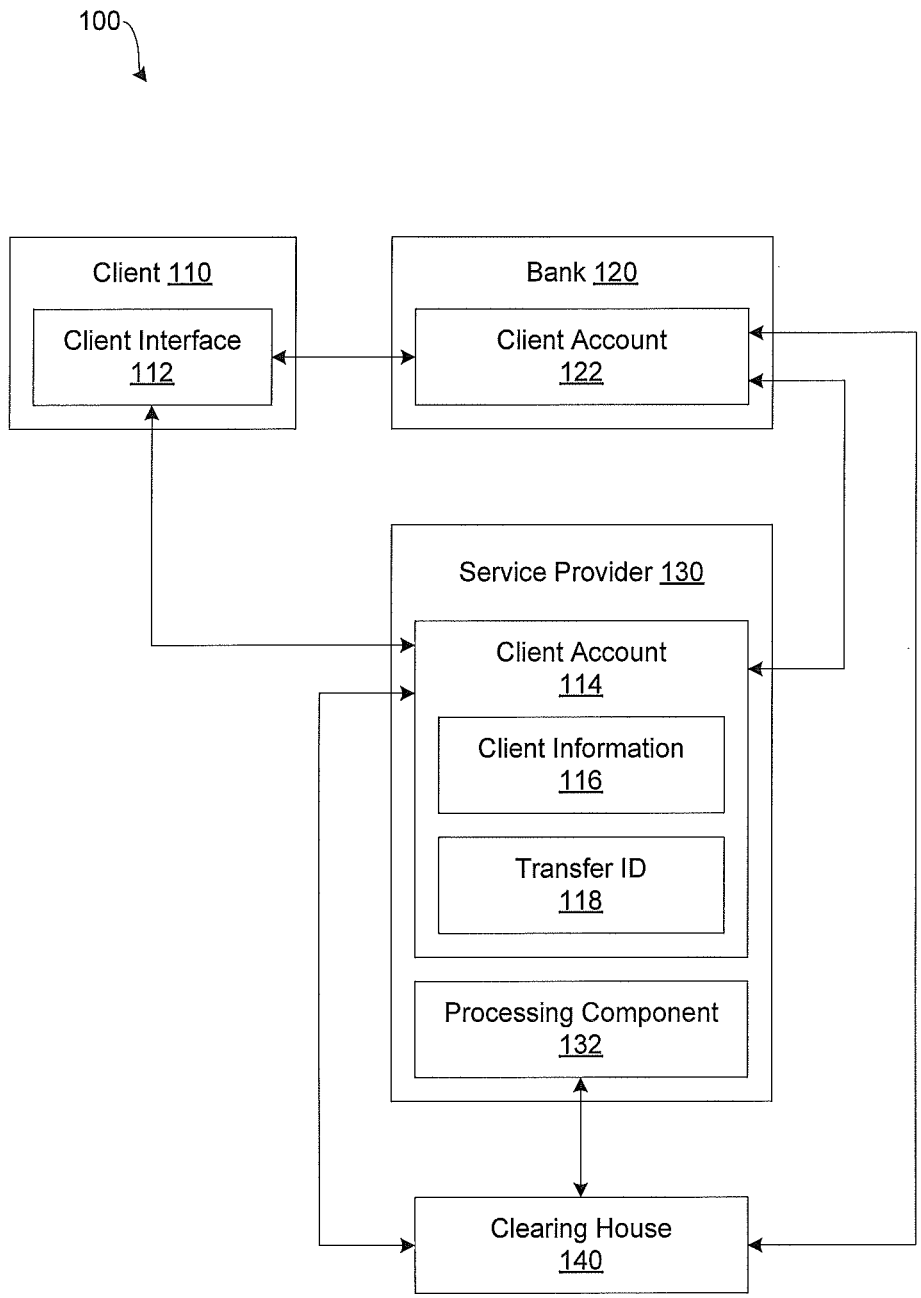
FIG. 1 shows a block diagram of a system adapted to facilitate account verification over a network, in accordance with embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure provide systems and methods for facilitating account verification over a network by utilizing a code issued by a service provider to verify and/or validate a client when the client conducts network transactions (e.g., fund transfers) with a trusted entity (e.g., regulated banking institution) using that code. For example, when the client requests a transfer of funds between accounts with the trusted entity and the service provider, the client is given a code by the service provider. The code is then utilized by the client to request a transfer of funds from the trusted entity to the service provider. The trusted entity sends a fund transfer request to service provider on behalf of the client, and the fund transfer request includes one or more of the name of the client, an account number, an amount, and the code. The service provider receives the fund transfer request from the trusted entity and verifies that the code was issued to the client, which may be stored as part of a client account with the service provider. Verification may enable the client to have higher limits on client accounts with the service provider and/or other advantages over non-verified clients. With increasing fraud and identity theft in electronic commerce, verification provides a way to enable trust and combat fraud.

FIG. 1 shows one embodiment of a system 100 adapted to facilitate account verification over a network. As shown in FIG. 1, the system 100 includes a client 110, a bank 120 (e.g., a regulated financial institution), and a service provider 130 adapted to process transactions on behalf of the client 110 and/or the bank 120. It should be appreciated that the bank 120 may comprise a plurality of banks with each having a client account 122. It should also be appreciated that the client 110 may be referred to as a user or customer without departing from the scope of the present disclosure.

In one embodiment, the client 110 establishes a client account with the service provider 130, wherein the client 110 may deposit monetary funds in the client account 114 via a network, such as the Internet, a mobile telecommunication network, etc. In one aspect, the service provider 130 may issue the client 110 some form of electronic commerce media, such as a electronic check resource, credit card, debit card, etc., that is linked to the client account 114. The client 110 is adapted to communicate with the bank 120 and the service provider 130 via the network by utilizing a client interface 112, such as a computing device (e.g., personal computer), a mobile communication device (e.g., mobile phone), and/or a network browser. The client 110 may establish the client account 114 with the service provider 130 via the client interface 112, and the client 110 may link one or more other accounts, such as the client account 122 with the bank 120, to the client account 114 with the service provider 130. The client 110 provides client information 116 to the service provider 130 to verify and/or validate client identification. The client 110 may also provide the client information 116 to the bank 120 to verify and/or validate client identification. The client information 116 may include one or more of username, password, personal identification number (PIN) and/or code (PIC), credit card number, debit card number, photograph image, biometric id, address, phone number, etc.

In one embodiment, for client verification over the network, the client 110 is able to access the client account 114 and request a transfer ID 118, which may also be referred to as a smart ID, from the service provider 130. In various implementations, the transfer ID 118 comprises a transfer identification (ID) code or a smart identification (ID) code. In one aspect, the transfer ID 118 allows the client 110 to provide verification for a transfer of funds between client related accounts, such as accounts 114, 122. For example, the client 110 may access the service provider 130 via a network connection, such as an Internet link, mobile phone link, landline link, etc., and request the transfer ID 118 via the user interface 112, such as a web browser or various other network software. In another example, the client 110 may confer with an agent related to the service provider 130 to request the transfer ID 118.

In one embodiment, the transfer ID 118 is issued to the client 110 by the service provider 130 to provide verification for the client 110 when the client 110 requests a fund transfer transaction with a trusted entity, such as the bank 120, using the issued transfer ID 118. In one aspect, the service provider 130 may then classify the client 110 as a verified client after a successful fund transfer with a trusted entity, provided that the account 122 with the bank 120 was automatically or manually added as being related to the client account 114 with the service provider 130. This verified status of the client 110 may enable the service provider 130 to raise spending limits for the client account 114. Further scope related to the transfer ID and the verification process is described in greater detail herein.

In one embodiment, the service provider 130 includes a processing component 132 that is adapted to communicate with a clearing house 140 to debit the client account 122 with the bank 120 and credit the client account 114 with the service provider 130 according to an amount specific to the fund transfer request. In one embodiment, when a fund transfer is approved and completed, the clearing house 140 resolves financial transactions through validation, delivery, and settlement. As such, the clearing house 140 may comprise an agency or institution having a system for settling indebtedness between members of that system through which accounts may be debited and/or credited of monetary funds.

In one implementation, upon receiving a fund transfer request from the bank 120, the processing component 132 is adapted to access the client account 114, review the transfer ID 118 stored with the account 114, and determine whether the transfer ID 118 sent with the fund transfer request is the same as the transfer ID 118 stored with the account 114. If the transfer IDs 118 match, then the processing component 132 may approve the fund transfer between client accounts 114, 122. Otherwise, if the transfer IDs 118 do not match, then the processing component 132 may suspend, deny, or cancel the fund transfer between client accounts 114, 122. In the event of an approved, suspended, or denied fund transfer request, the processing component 132 may be adapted to notify the client 110 and/or the bank 110 of a fund transfer status related to approval, suspension, or denial.

In various embodiments, transactions related to fund transfers may take place over a network, such as the Internet, a mobile communication network, a landline communication network, a satellite communication network, etc. The interface device 112 of the client 110 may include a network interface device, such as a computer, mobile phone, personal digital assistant, etc., that is adapted to allow the client 110 to communicate with the bank 120 and the service provider 130 via the network. The bank 120 may utilize a server that is adapted to communicate with the client 110 to allow access to the client account 122 and requests for fund transfers via the network and communicate with the service provider 130 to process fund transfer transactions via the network. Similarly, the service provider 130 may utilize a server adapted to communicate with the client 110, the bank 120, and/or the clearing house 140 to process and resolve fund transfer requests and various other financial transactions over the network. In one implementation, the service provider 130 may utilize a server having the processing component 132 and a storage component adapted to locally store one or more accounts, including the client account 114, along with information related to one or more clients, including the client information 116 related to the client 110.

In various embodiments, the network may be implemented as a single network or a combination of multiple networks. For example, in various embodiments, the network may include the Internet, one or more intranets, landline networks, wireless networks, and/or some other appropriate type of communication network. In another example, the network may comprise a wireless telecommunications network (e.g., cellular phone network) adapted to communicate with other communication networks, such as the Internet.

In one embodiment, the client 110 may utilize the interface device 112, such as a personal computer, mobile phone device, etc., to communicate with the bank 120 and the service provider 130 and/or access the client accounts 114, 122, respectively, via any appropriate combination of hardware and/or software configured for wired and/or wireless communication over the network. In one implementation, the client 110 may use a browser application to browse information available over the network. For example, the client 110 may use a web browser to view client account information available over the Internet from the bank 120 and/or the service provider 130.

In one embodiment, the client 110 may be asked to provide identification information to the service provider 130 for fund transfer processing. For example, the identification information provided by the client 110 may include personal information (e.g., a username, password, personal identification number (PIN) and/or code (PIC), credit card number, debit card number, photograph image, biometric id, address, phone number, etc.) and banking information related to one or more banks, such as the bank 120 (e.g., banking institution, credit card issuer, user account numbers, security information, etc.). In one implementation, identification information provided by the client 110 may be passed with a fund transfer request to the processing component 132 of the service provider 130 to associate the client 110 with the client accounts 114, 122 and the transfer ID 118.

In one embodiment, the bank 120 may provide identification information related to the client 110 and/or the bank 120 to be included as part of the fund transfer request. The identification information may include personal, business, and/or banking information. In various implementations, the identification information provided by the bank 120 may be passed with the fund transfer request to the processing component 132 of the service provider 130 to process the fund transfer request, and the identification information provided by the bank 120 may be used by the processing component 132 to associate the fund transfer with the client 110 and/or the bank 120.

In one embodiment, the service provider 130 is adapted to provide transaction processing, including fund transfers, on behalf of the client 110 and the bank 120. In this regard, the service provider 130 may utilize some form of processing application configured to interact with the client 110 and the bank 120 to facilitate transactions, including fund transfers and identity verification through fund transfers. In one example, the service provider 130 may be provided by PayPal, Inc. of San Jose, Calif., USA.

In one embodiment, the service provider 130 may be adapted to maintain a plurality of accounts, including the client account 114, which may include account information related to client 110, such as the client information 116. Accordingly, the service provider 130 is adapted to store information related to a plurality of clients, including the client 110, as part of each client account, such as the client account 114. For example, the stored information includes the client information 116, such as the name of the client 118 and the transfer ID 118 associated with the client 110. In another example, account information may include private financial information of the client 110, such as an account number, username, password, personal identification number (PIN) and/or code (PIC), credit card information, debit card information, banking information, and/or other types of financial information, which may be used to facilitate transactions including fund transfers, between the client 110, the bank 120, and/or the service provider 130.

Figure 2:
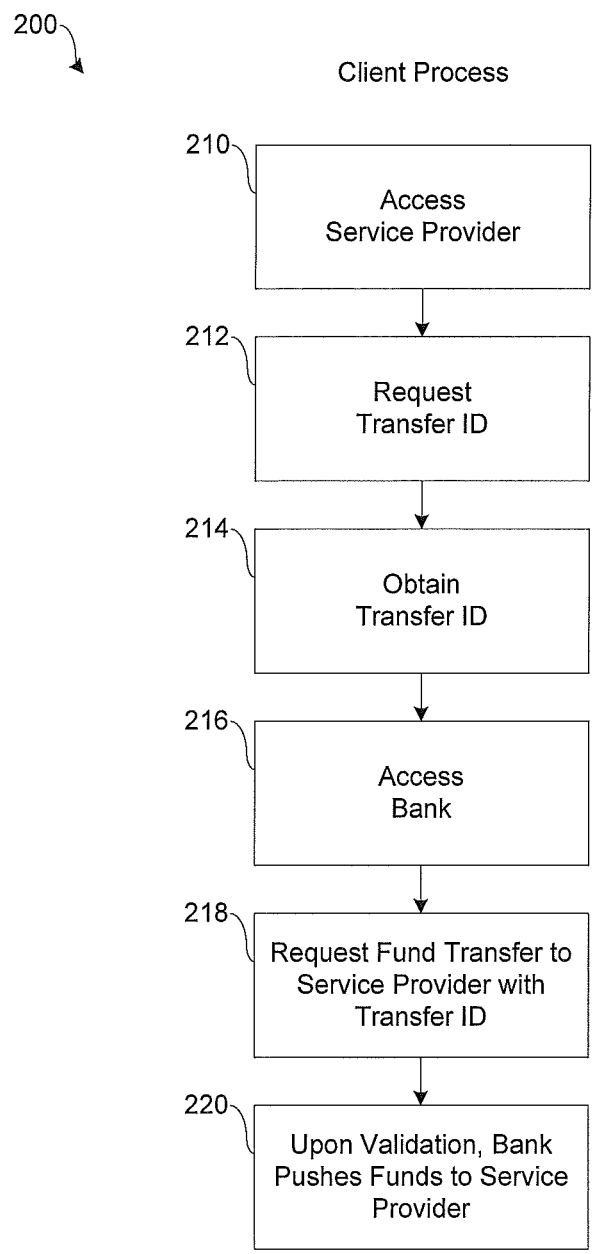
FIG. 2 shows a method of a client-side process for facilitating account verification over a network, in accordance with embodiments of the present disclosure.

FIG. 2 shows one embodiment of a method 200 of a client-side process for facilitating account verification over a network. For purposes of explanation, the method 200 of FIG. 2 is discussed in reference to FIG. 1, but should not be limited thereto.

In one implementation, the client 110 may utilize the client interface 112 to access the service provider 130 (block 210) and request a transfer ID 118 from the service provider 130 (block 212). After obtaining the transfer ID 118 (block 214), the client 110 may utilize the client interface 112 to access the bank 120 and the client account 122 related thereto (block 216) and request a fund transfer (e.g., an electronic fund transfer (EFT)) from the bank 120 including the transfer ID118 as part of the fund transfer request (block 218).

In one aspect, obtaining the transfer ID 118 from the service provider 130 over the network allows the client 110 to include the transfer ID 118 in a fund transfer request. As such, the client 110 may request a transfer of funds from the client account 122 with the bank 120 to the client account 114 with the service provider 130 by providing the transfer ID 118 as identification information to be included as part of the fund transfer request. Upon validation of the client's identity by the service provider 130 based, at least in part, on the verifying the transfer ID 118, the bank 120 is adapted to debit the client account 122 and push (i.e., send or transfer) the funds requested by the fund transfer to the service provider 130 for deposit in the client account 114 (block 220). The service provider 130 may also validate the identity of the client 110 by verifying client information, such as client name, in the fund transfer request.

In one embodiment, the client 110 provides the transfer ID 118 issued by the service provider 130 with the fund transfer request. When transferring funds from account 122 to account 114, the bank 120 submits the transfer ID 118 to the service provider 130 as part of the fund transfer. When the bank 120 sends a statement to the service provider 130 referring to the client 110, which may include a client name, account number, amount, and the transfer ID 118, the service provider 130 verifies that the transfer ID 118 sent to the client 110 is the same as the transfer ID 118 sent with the funds. In one aspect, this process may be used by the service provider 130 to verify the identity of the client 110. Further scope related to the transfer ID and the verification process is described in greater detail herein.

In one implementation, the client 110 may establish the client account 114 with the service provider 130, and when establishing the client account 114, the client 110 may be prompted to provide personal identification information, such as a client name, password, personal identification number (PIN) and/or code (PIC), credit card number, debit card number, photograph image, biometric id, address, phone number, etc., and financial information, such as banking information, credit information, account numbers, security information, etc. In one aspect, information related to the client 110 may be packaged as a client identifier, which may include attributes related to the client 110, such as personal information and banking information. In various aspects, the client identifier may be passed with a login request, access request, purchase request, and/or transaction request to the service provider 130 via the network, and the client identifier may be used by the service provider 130 to associate the client 110 with a particular client account, such as the client account 114, maintained by the service provider 130. In one aspect, the client 110 may link other accounts, such as the client account 122 with the bank 120, with the client account 114 to electronically transfer or deposit monetary funds into the client account 114. In another aspect, the client 110 may be prompted to provide identification information to the service provider 130 and banking information related to the client account 122 and the bank 120 prior to transferring funds into the client account 114.

Figure 3:
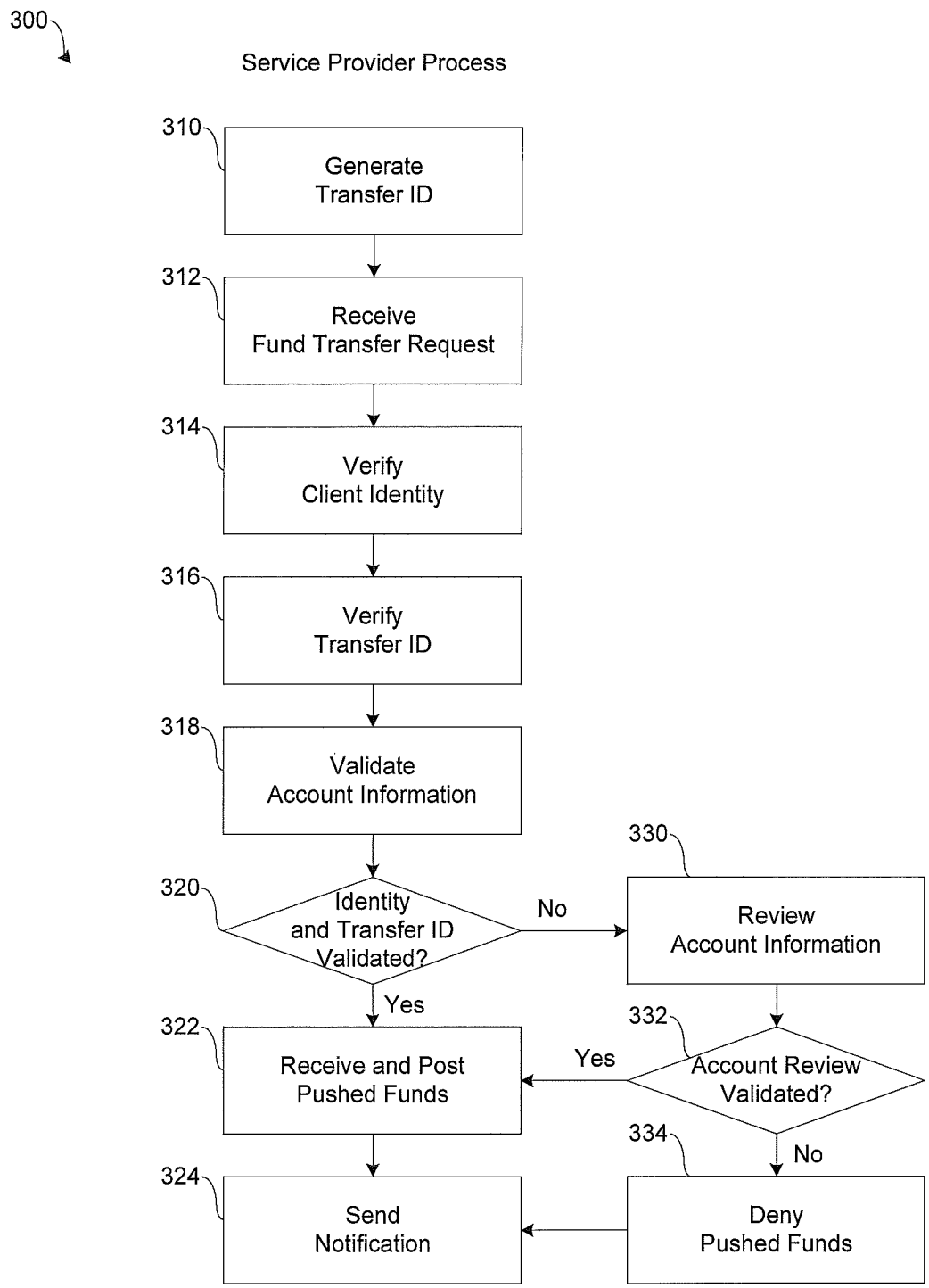
FIG. 3 shows a method of a server-side process for facilitating account verification over a network, in accordance with embodiments of the present disclosure.

FIG. 3 shows one embodiment of a method 300 of a server-side process for facilitating account verification over a network. For purposes of explanation, the method 300 of FIG. 3 is discussed in reference to FIG. 1, but should not be limited thereto.

In one implementation, the service provider 130 is adapted to generate a transfer ID 118 for the client 110 based on request by the client 110 (block 310). In one aspect, when generating the transfer ID 118 for the client 110, the service provider 130 is adapted to associate the transfer ID 118 to the client account 114 and/or provide the transfer ID 118 to the client 110 over the network via, for example, the client interface 112. In another aspect, the transfer ID 118 is unique to the client 110 and/or the client account 114.

The service provider 130 is adapted to receive a fund transfer request from a trusted entity, such as the bank 110, on behalf of the client 110 over the network (block 312). In one aspect, the fund transfer request comprises a request for an electronic fund transfer (EFT) initiated by the client 110 from at least one account with the trusted entity, such as the client account 122 with the bank 120. In another aspect, the fund transfer request includes the transfer ID 118 and/or the name of the client 110 as identity information.

The service provider 130 is adapted to verify the identity of the client 110 based on information passed with the fund transfer request (block 314). In one aspect, when verifying the identity of the client 110, the service provider 130 is adapted to extract information from the fund transfer request including the client name associated with the fund transfer request, access the client account 114 related to the client 110, extract information from the client account 114 including the client name associated with the client account 114, and determine whether the client name associated with the client account 114 matches the client name extracted from the fund transfer request.

Accordingly, the service provider 130 is adapted to compare and determine if a match exists between the client name related to the client account 114 and the client name provided as part of the fund transfer request. If the client names are compared and a match is determined, then the identity of the client 110 is verified. If the client names are compared and a match is not determined, then the identity of the client 110 is not verified.

The service provider 130 is adapted to verify the transfer ID 118 related to the client 110 based on information passed with the fund transfer request (block 316). In one aspect, when verifying the transfer ID 118 related to the client 110, the service provider 130 is adapted to extract information from the fund transfer request including the transfer ID 118 associated with the fund transfer request, access the client account 114 related to the client 110, extract information from the client account 114 including the transfer ID 118 associated with the client account 114, and determine whether the transfer ID 118 associated with the client account 114 matches the transfer ID 118 extracted from the fund transfer request.

Accordingly, the service provider 130 is adapted to compare and determine if a match exists between the transfer ID 118 related to the client account 114 and the transfer ID provided as part of the fund transfer request. If the transfer IDs are compared and a match is determined, then the transfer ID 118 of the client 110 is verified. If the transfer IDs are compared and a match is not determined, then the transfer ID of the client 110 is not verified.

The service provider 130 is adapted to validate the account information of the client 110 (block 318) if the identity of the client 110 is verified (block 314) and/or if the transfer ID 118 of the client 110 is verified (block 316). In one implementation, the service provider 130 is adapted to approve the fund transfer request, if the client name associated with the client account 114 matches the client name extracted from the fund transfer request, and the service provider 130 is adapted to suspend, deny, or cancel the fund transfer request, if the client name associated with the client account 114 fails to match the client name extracted from the fund transfer request. In another implementation, the service provider 130 is adapted to approve the fund transfer request if the transfer ID 118 associated with the client account 114 matches the transfer ID 118 extracted from the fund transfer request, and the service provider 130 is adapted to suspend, deny, or cancel the fund transfer request, if the transfer ID 118 associated with the client account 114 fails to match the transfer ID 118 extracted from the fund transfer request.

If the identity and the transfer ID of the client 110 is determined to be validated (block 320), then the client 110 is determined to have ownership of the client accounts 114, 122, and the service provider 130 receives and posts the pushed funds to the client account 114 (block 322). In one aspect, the service provider 130 may update the client account 114 by listing the client 110 as a verified client after approving the fund transfer request. In another aspect, once the fund transfer request is completed and the funds are deposited in the client account 114, the service provider 130 may notify the client 110 and/or the bank 120 of the completed fund transfer and/or deposited funds (block 324). In various implementations, the service provider 130 may send a notification message to the client 110 over the network via the client interface 112, and the client 110 may be notified with an email message, a text message, voice mail message, etc.

Otherwise, if the identity and the transfer ID of the client 110 is determined to not be validated (block 320), then the service provider 130 is adapted to suspend the fund transfer for a predetermined time period and review the client's account information for any errors (block 330). If, after review, the service provider 130 is unable to validate the identity and transfer ID of the client 110 (block 332), then the client 110 may not be determined to have ownership of the client accounts 114, 122, and the service provider 130 denies or cancels the fund transfer and rejects the funds for deposit in the client account 114 (block 334). Once the fund transfer request is denied and the funds are not deposited in the client account 114, the service provider 130 may notify the client 110 and/or the bank 120 of the denied or cancelled fund transfer and/or the non-deposited funds (block 324). As previously discussed, the service provider 130 may send a notification message to the client 110 over the network via the client interface 112, and the client 110 may be notified with an email message, a text message, voice mail message, etc.

In one aspect, the client 110 initiates the fund transfer from the client's bank account, such as client account 122 with the bank 120. With an accurate name match (e.g., bank account 122 versus service provider account 114), and with an accurate transfer ID match (e.g., transfer ID provided by service provider versus transfer ID provided with fund transfer request), the service provider 130 is adapted to confirm client ownership of the client's bank account 122 and the client's identity. In another aspect, the service provider 130 validates the bank information and the client account 122 as legitimate by matching the transfer IDs and client names on the client accounts 114, 122. If an accurate match is determined, then the bank information is added to the client account 114 as a confirmed status of the bank 120 and client account 122, and the service provider 130 pushes (i.e., transfers) the funds to the client account 114. In another aspect, in case there is no accurate match, the funds may be pushed to a temporary account for manual review of identity and transfer IDs.

In one implementation, the service provider 130 may be adapted to establish a client account 114 with the client 110 based on information provided or inputted by the client via the client interface 112. When establishing the client account 114 with the client 110, the service provider 130 may be adapted to prompt the client 110 to provide identification information, such as a client name, password, personal identification number (PIN) and/or code (PIC), credit card number, debit card number, photograph image, biometric id, address, phone number, etc., and financial information, such as banking information, credit information, account numbers, security information, etc. In one aspect, information related to the client 110 may be stored as part of the client account 114 and may be packaged as a client identifier, which may include attributes associated with the client 110, such as personal information and banking information. In various aspects, the client identifier may be passed with the fund transfer request from the bank 120 to the service provider 130 via the network, and the client identifier may be used by the service provider 130 to associate the client 110 with a particular client account, such as the client account 114, maintained by the service provider 130. In one aspect, the service provider 130 is adapted to link other accounts, such as the client account 122 with the bank 120, with the client account 114 to transfer or deposit funds into the client account 114. As such, the service provider 130 may prompt the client 110 to provide permission to link one or more other accounts to the client account 114 and to provide identification information to the service provider 130 prior to transferring and/or depositing funds into the client account 114.

Figure 4:
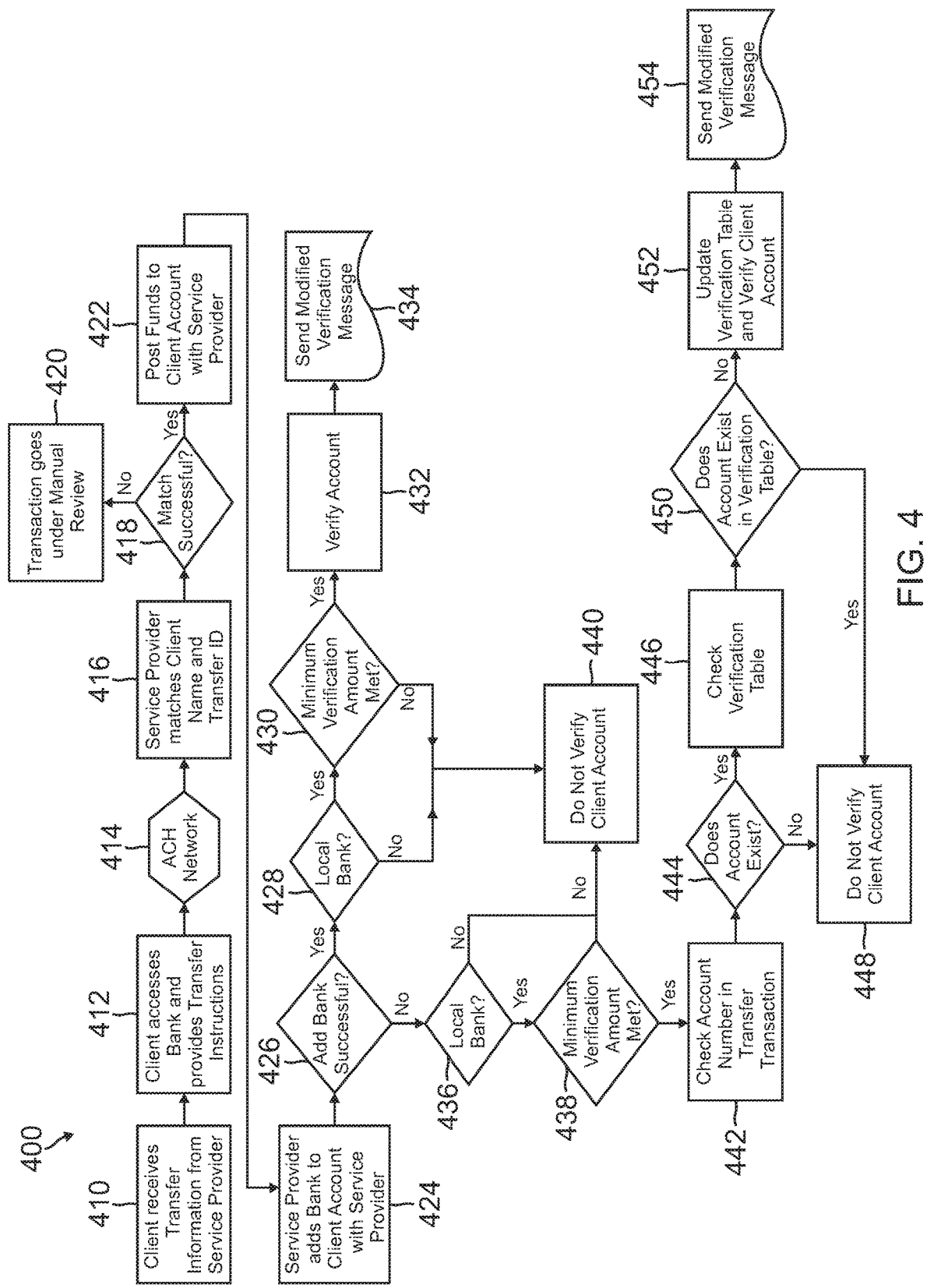
FIG. 4 shows a method for facilitating account verification over a network, in accordance with embodiments of the present disclosure.

FIG. 4 shows one embodiment of a method 400 for facilitating account verification over a network. For purposes of explanation, the method 400 of FIG. 4 is discussed in reference to FIG. 1, but should not be limited thereto.

In one implementation, when the client 110 requests a transfer of funds to the service provider 130 from the bank 120, the client 110 is given a transfer ID 118 (i.e., verification code) by the service provider 130. The transfer ID 118 is used when the client 110 accesses the client bank account 122 with the bank 120 to request the transfer of funds from the client bank account 122 to the client account 114 with the service provider 130. When the bank 120 sends a statement to the service provider 130 about the client 110, which may include a client name, account number, amount, and the transfer ID 118, the service provider 130 may verify that the same transfer ID 118 was used to verify the client 110 as owner of the client account 114. This verification enabled the client 110 to have higher spending limits or other advantages over non-verified clients.

In one embodiment, referring to the method 400 of FIG. 4, the client 110 receives transfer information from the service provider 130 (block 410). In one aspect, the transfer information includes the unique transfer ID 118 issued to the client 110 by the service provider 130. The transfer ID 118 is generated based on request by the client 110.

The client 110 accesses the bank 120 and provides transfer instructions to the bank 120 (block 412). The transfer instructions include identity information related to the client 110 and the transfer ID 118. In the transfer instructions, the bank 120 is instructed by the client 110 to include the identity information and the transfer ID 118 with the request for the transfer of funds from the client bank account 122 to the client account 114 with the service provider 130.

The bank 110 sends a request for a transfer of funds to the service provider 130 based on information in the transfer instructions via, for example, the automatic clearing house (ACH) network (block 414). It should be appreciated that the ACH network may comprise any agency or institution having a system for settling indebtedness between members of that system through which accounts may be debited and/or credited of monetary funds, without departing from the scope of the present disclosure.

The service provider 130 receives the fund transfer request from the bank 120, which includes the client identity information and the transfer ID 118, and the service provider 130 matches the client identity information, such as client name, and the transfer ID 118 to the client information 116 and transfer ID 118 stored as part of the client account 114 (block 416) to confirm the client 110 as owner of the client account 114.

If the match is successful (block 418), then the transferred funds are received from the bank 120 and posted to the client account 114 (block 422). Otherwise, if the match is not successful (block 418), then the fund transfer transaction is placed under manual review (block 420). Once the transferred funds are posted to the client account 114, the service provider 130 adds the bank 120 to the client account 114 (block 424).

The service provider 130 determines if the bank 120 is a successful addition (block 426). In one implementation, if the bank 120 is a successful addition, then the service provider 130 determines if the bank 120 is a local bank (block 428). If the bank 120 is a local bank, then the service provider 130 determines if a minimum verification amount is met (block 430). If the minimum verification amount is met, then the service provider 130 verifies the account (block 432) and sends a modified verification message to the client 110 (block 434). In one aspect, the modified verification message may comprise an email, text message, voice mail message, etc. In another aspect, if the bank 120 is not considered a local bank (block 428), or if the minimum verification amount is not met (block 430), then the service provider 130 does not verify the client account 114 (block 440).

Otherwise, in another implementation, if the bank 120 is not a successful addition (block 426), then the service provider 130 determines if the bank 120 is a local bank (block 436). If the bank 120 is a local bank, then the service provider 130 determines if a minimum verification amount is met (block 438). If the minimum verification amount is met, then the service provider 130 checks the account number in the fund transfer transaction (block 442), and determines whether the account exists (block 444). In one aspect, if the bank 120 is not considered a local bank (block 436), or if the minimum verification amount is not met (block 438), then the service provider 130 does not verify the client account 114 (block 440).

Next, if the account is determined to exist (block 444), then the service provider 130 is adapted to check a verification table (block 446) and determine whether the account exists in the verification table (block 450). If the account does not exist in the verification table, then the service provider 130 updates the verification table and verifies the client account 114 (block 452). Then, the service provider 130 sends a modified verification message to the client 110 (block 454). In one aspect, the modified verification message may comprise an email, text message, voice mail message, etc. Otherwise, if the account does not exist (block 444), or if the account exists in the verification table (block 450), then the service provider 130 does not verify the client account 114 (block 448).

In various aspects of the present disclosure, with increasing fraud and identity theft, verification provides a system and method to enable trust and combat fraud in electronic commerce (i.e., e-commerce). Verified clients or users may have additional benefits, such as lifting spending limits or allowing higher amount payments. Verification may serve as a verification score check, such as a credit check, for third parties.

Figure 5:
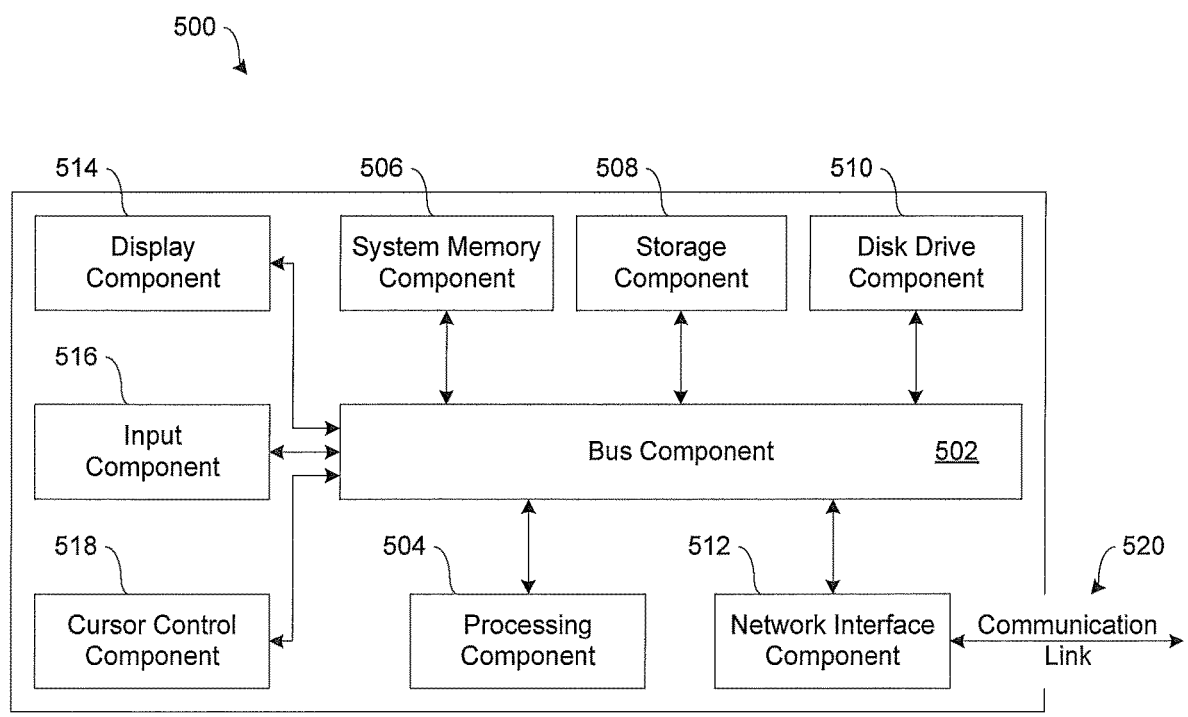
FIG. 5 shows a block diagram of a computer system suitable for implementing embodiments of the present disclosure.

FIG. 5 shows a block diagram of a computer system 500 suitable for implementing embodiments of the present disclosure. Computer system 500 includes a bus 502 or other communication mechanism for communicating information, which interconnects subsystems and components, such as processing component 504 (e.g., processor, micro-processor, micro-controller, digital signal processing (DSP) device), system memory component 506 (e.g., RAM), static storage component 508 (e.g., ROM), disk drive component 510 (e.g., magnetic or optical), network interface component 512 (e.g., modem, Ethernet card, wireless transceiver), display component 514 (e.g., CRT or LCD), input component 516 (e.g., keyboard), and cursor control component 518 (e.g., mouse or trackball).

In accordance with embodiments of the present disclosure, computer system 500 performs specific operations by processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of or in combination with software instructions to implement embodiments of the present disclosure.

Logic may be encoded in a computer readable medium, which may refer to any medium that participates in providing instructions to processor 504 for execution. Such a medium may take many forms, including but not limited to, non-volatile media and volatile media. In various implementations, non-volatile media includes optical or magnetic disks, such as disk drive component 510, and volatile media includes dynamic memory, such as system memory component 506. It should be appreciated that data and information related to instructions may be transmitted to computer system 500 via various types of transmission media, such as coaxial cables, copper wire, and fiber optics, including wires that comprise bus 502. In various examples, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the systems and methods described herein may be performed by computer system 500. In various other embodiments of the present disclosure, a plurality of computer systems 500 coupled by communication link 520 (e.g., LAN, wireless LAN, wireless network) may perform instruction sequences to practice the systems and methods described herein in coordination with one another.

Computer system 500 may transmit and receive messages, data, information and instructions, including one or more programs (i.e., application code) through communication link 520 and network interface component 512. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for facilitating account verification over a network, the method comprising:
   receiving, by one or more processors associated with a service provider over a network, a transfer code request from a user device associated with a client account with the service provider;
   in response to receiving the transfer code request, transmitting, by the one or more processors over the network to the user device, a transfer code associated with the client account;
   receiving, by the one or more processors from a server associated with a financial institution over the network, a fund transfer request for transferring funds from an account with the financial institution to the client account with the service provider;
   authenticating, by the one or more processors, the fund transfer request by verifying that the fund transfer request includes a client identifier associated with the client account and the transfer code submitted to the user device;
   in response to the authenticating, automatically linking, by the one or more processors, the account with the financial institution to the client account with the service provider; and
   posting, by the one or more processors, the funds received from the account with the financial institution to the client account with the service provider.

2. The method of claim 1, wherein the transmitting the transfer code causes the transfer code to be presented on a web interface displayed on the user device, and wherein the web interface is associated with the service provider.

3. The method of claim 1, wherein the client identifier includes a client name, and wherein the financial institution comprises a banking institution.

4. The method of claim 1, further comprising generating the transfer code for the client account, wherein the transfer code is unique to the client account with respect to other accounts with the service provider.

5. The method of claim 1, further comprising:
   establishing, for a client, the client account with the service provider over the network; and
   updating the client account with the service provider by listing the client as a verified client after authenticating the fund transfer request.

6. The method of claim 5, further comprising providing a client interface on the user device, wherein the client account is established via the client interface.

7. The method of claim 1, further comprising receiving monetary funds from the financial institution.

8. The method of claim 1, wherein the fund transfer request is initiated by a client via accessing the server of the financial institution over the network.

9. The method of claim 1, further comprising:
   maintaining a plurality of accounts including the client account with the service provider; and
   storing the client identifier and the transfer code as part of the client account with the service provider.

10. The method of claim 1, further comprising in response to authenticating the fund transfer request, transmitting to the user device a notification indicating that the fund transfer request is approved.

11. The method of claim 1, wherein the fund transfer request further comprises an amount, and wherein the method further comprises:
    determining that the financial institution is located within a predetermined distance from the user device; and
    in response to determining that the financial institution is located within the predetermined distance from the user device, determining that a minimum verification amount is met based on the amount of the fund transfer request.

12. A system, comprising:
    a non-transitory memory; and
    one or more hardware processors coupled to the non-transitory memory and configured to read instructions from the non-transitory memory to cause the system to perform operations comprising:
      receiving, from a server associated with a financial institution over the network, a fund transfer request for transferring funds from an account with the financial institution to a client account with a service provider;
      accessing the client account with the service provider, wherein the client account is associated with a client identifier and a transfer code;
      authenticating the fund transfer request by verifying that the fund transfer request includes the client identifier and the transfer code;
      in response to the authenticating, automatically linking the account with the financial institution to the client account with the service provider; and
      posting the funds received from the account with the financial institution to the client account with the service provider.

13. The system of claim 12, wherein the operations further comprise causing the transfer code to be presented on a web interface displayed on a user device associated with the client account, wherein the web interface is associated with the service provider.

14. The system of claim 12, wherein the operations further comprise:
   generating the transfer code for the client account, wherein the transfer code is unique to the client account with respect to other accounts with the service provider; and
   transmitting, over the network, the transfer code to a user device associated with the client account.

15. The system of claim 14, wherein the transfer code is transmitted to the user device in response to receiving a transfer code request from the user device.

16. The system of claim 12, wherein the operations further comprise:
   establishing, for a client, the client account with the service provider over the network; and
   updating the client account with the service provider by listing the client as a verified client in response to authenticating the fund transfer request.

17. The system of claim 12, wherein the operations further comprise receiving monetary funds from the financial institution.

18. The system of claim 12, wherein the operations further comprise in response to authenticating the fund transfer request, transmitting to a user device associated with the client account a notification indicating that the fund transfer request is approved.

19. A non-transitory machine-readable medium having stored thereon machine-readable instructions executable to cause a machine associated with a service provider to perform operations comprising:
   receiving, over a network, a transfer code request from a user device associated with a client account with the service provider;
   in response to receiving the transfer code request, transmitting, over the network to the user device, a transfer code associated with the client account;
   receiving, from a server associated with a financial institution over the network, a fund transfer request for transferring funds from an account with the financial institution to the client account with a service provider;
   verifying that the fund transfer request includes a client identifier associated with the client account and the transfer code transmitted to the user device;
   in response to the verifying, automatically adding the account with the financial institution to the client account with the service provider; and
   transmitting, to the user device, a notification indicating that the fund transfer request is approved.

20. The non-transitory machine-readable medium of claim 19, wherein the fund transfer request further comprises an amount, and wherein the operations further comprise:
   determining that the financial institution is located within a predetermined distance from the user device; and
   in response to determining that the financial institution is located within the predetermined distance from the user device, determining that a minimum verification amount is met based on the amount of the fund transfer request.

* * * * *